United States Patent
Nakamura et al.

(10) Patent No.: US 7,367,097 B2
(45) Date of Patent: May 6, 2008

(54) TOOL MOUNTING DEVICE FOR TURNING CENTER

(75) Inventors: Takio Nakamura, Nagaoka (JP); Akihiro Goto, Nagaoka (JP); Tatsuo Shimizu, Nagaoka (JP); Takashi Ueda, Nagaoka (JP)

(73) Assignee: O-M Ltd., Osaka (JP)

( * ) Notice: Subject to any disclaimer, the term of this patent is extended or adjusted under 35 U.S.C. 154(b) by 205 days.

(21) Appl. No.: 11/337,650

(22) Filed: Jan. 24, 2006

(65) Prior Publication Data
US 2006/0196026 A1 Sep. 7, 2006

(30) Foreign Application Priority Data
Mar. 1, 2005 (JP) .............................. 2005-056153

(51) Int. Cl.
B23P 23/00 (2006.01)
B23C 5/26 (2006.01)
(52) U.S. Cl. ...................... 29/27 C; 409/233; 409/231
(58) Field of Classification Search ................ 29/27 C, 29/27 R; 483/18; 409/233, 232, 231; 408/239 R
See application file for complete search history.

(56) References Cited

U.S. PATENT DOCUMENTS

| | | | | |
|---|---|---|---|---|
| 3,699,843 | A | * | 10/1972 | Sweeny .......................... 407/9 |
| 7,220,089 | B2 | * | 5/2007 | Nakamura et al. .......... 409/233 |
| 2003/0152433 | A1 | * | 8/2003 | Geissler ...................... 409/233 |

FOREIGN PATENT DOCUMENTS

| | | | | |
|---|---|---|---|---|
| JP | 10-015715 | A | * | 1/1998 |
| JP | 2001-162486 | A | * | 6/2001 |
| JP | 2004-050324 | A | | 2/2004 |
| JP | 2004-202659 | A | | 7/2004 |
| JP | 2004-216536 | A | | 8/2004 |

* cited by examiner

*Primary Examiner*—Erica Cadugan
(74) *Attorney, Agent, or Firm*—Sughrue Mion, PLLC

(57) ABSTRACT

There is provided an innovative tool mounting device for a turning center in which special manipulation is not required even with a simple configuration, and whereby when a cutting tool is clamped/fixed, the bearing unit is deformed by the retraction force of the drawbar because the cutting tool is supported by the ram, the tapered shank is automatically pressed to the mounting engagement unit in a state in which the cutting tool is supported by the ram, an automatic mechanical lock in a state of dual-surface restraint can be implemented, and the turning tool can be securely clamped/fixed. The tool mounting device for a turning center is configured so that a positioning strike receiving portion (29) is provided to a ram (3) with which the positioning outer surface (28) of a turning tool (1B) makes contact when at least the turning tool (1B) is clamped/fixed, the positioning outer surface (28) strikes the positioning strike receiving portion (29) when a drawbar (7) is retracted, a bearing unit (2) is deformed by the retraction force applied to the drawbar (7) of the clamp mechanism (8) because the retracted position of the drawbar (7) is maintained in the struck state, and the mounting engagement unit 6 exerts elastic pressure/contact on the tapered shank (5).

9 Claims, 13 Drawing Sheets

TOOL MOUNTING DEVICE FOR TURNING CENTER

BACKGROUND OF THE INVENTION

1. Technological Field of the Invention

The present invention relates to a tool mounting device for a turning center that can suitably exchange rotating tools and turning tools to perform milling and cutting (turning).

2. Background Art

In a turning center, a mounting engagement unit for engaging a tapered shank provided to the base end of a tool is disposed on a main shaft that is rotatably mounted on a ram via a bearing unit. A clamp mechanism is disposed for clamping a clamping convexity of the tapered shank by retracting the drawbar and drawing/engaging the tapered shank to the mounting engagement unit to detachably/replaceably mount and fix the tool to the main shaft so as to allow the shaft to be clamped and released based on the reciprocating control of the drawbar. Tools are suitably attached and detached using the shared clamping mechanism, and rotating tools are rotatably clamped/fixed together with the main shaft. When turning tools are clamped/fixed, the tools are baffled and fixed together with the main shaft (fixed to the ram); and rotating tools and turning tools can thereby be suitably exchanged and mounted, and both milling and cutting can be carried out.

In such a turning center, when the clamp mechanism of the rotating tools and turning tools is configured so as to be shared as described above, the radial load on the turning tools is considerably greater than on the rotating tools, and the clamp force must therefore be increased. In order to do so, a hydraulic cylinder device with a large diameter for outputting a considerable drive force must be used, and there are configurations in which a hydraulic two-stage cylinder is used.

Therefore, since a hydraulic cylinder device is conventionally necessarily required, an oilless structure cannot be obtained and energy and resources cannot be saved.

Also, the bearing unit provided to the main shaft tends to be damaged in an arrangement in which the tapered shank is merely lifted with considerable force and drawn into close contact with the mounting engagement unit so as to be able to counter such a significant radial load, and a cutting force is imparted using a key.

Therefore, a turning tool is clamped/fixed by a method in which the tapered shank is not pressed into contact with the mounting engagement unit in order to form a gap, and a tapered portion is separately provided for the turning tool, or a method in which mechanical locking is ensured by curvic coupling or tapering based on hydraulic clamping or releasing.

When a tapered portion is separately provided for the turning tool, however, the tapered portion must be made relatively deep to offer taper support, and specially designed tools must therefore be used, which prevents tool magazine sharing and becomes an impediment to general purpose usage.

In the case of a mechanical lock, a dual-surface restraint can be implemented with a receiving portion and pressing of the mechanical lock. Specially designed tools are not required and existing turning tools can be securely fixed, but a mechanical lock structure must be provided to the distal end of the ram, the structure becomes complicated, and exchange operations cannot be carried out as easily.

SUMMARY OF THE INVENTION

An object of the present invention is to provide an innovative tool mounting device for a turning center that solves such problems in the mounting structure for turning tools in the turning center on the basis of a completely novel concept in which a nontraditional approach is taken and attention is directed instead to the deformation of the bearing unit to be protected while the bearing unit is prevented from being damaged, whereby the deformation of the bearing unit is used so that a simple structure is devised and there is no need to perform special operations. When a cutting tool is clamped/fixed, an automatic mechanical lock can be implemented in a state of dual-surface restraint, and the turning tool can be securely clamped/fixed.

Another object is to provide an exceptionally improved tool mounting device for a turning center in which soil deposits are prevented and, for example, a protective cover therefor is not required, thereby allowing tool exchange time and costs to be further reduced by modifying the shape of the drive key while allowing powerful turning based on a dual-surface restraint to be performed.

The main points of the present invention are described below with reference to the diagrams.

In the tool mounting device for a turning center according to a first aspect, rotating tools 1A and turning tools 1B are exchanged and used, wherein a mounting engagement unit 6 for engaging a tapered shank 5 provided to the base end of a tool 1 is disposed on a main shaft 4 that is rotatably mounted on a ram 3 via a bearing unit 2; and a clamp mechanism 8 is disposed for clamping a clamping convexity 5A of the tapered shank 5 by retracting a drawbar 7 and drawing in and engaging the tapered shank 5 to the mounting engagement unit 6 to mount/fix tools 1 to the main shaft 4 so as to allow the shank to be clamped and released on the basis of the reciprocating control of the drawbar 7, comprising: a positioning strike receiving portion 29 provided to the ram 3, which a positioning outer surface 28 of the turning tool 1B strikes when at least the turning tool 1B is clamped/fixed; and the structure and arrangement of the bearing unit 2 being set so that the positioning outer surface 28 strikes the positioning strike receiving portion 29 when the drawbar 7 is retracted, and the bearing unit 2 is deformed via a rotational clearance by the retraction force applied to the drawbar 7 by the clamping action of the clamp mechanism 8 because the retracted position of the drawbar 7 is maintained in the struck state, and the mounting engagement unit 6 exerts elastic pressure/contact on the tapered shank 5.

In the tool mounting device for a turning center according to a second aspect, the bearing unit 2 comprises ram-fixed portions 2A fixed to the ram 3, and main shaft-fixed portions 2B fixed to the rotating main shaft 4, and bearing balls 2C rollably interposed therebetween; and the drawbar 7 is retracted, the main shaft-fixed portions 2B of the bearing unit 2 are slightly moved in the return direction of the drawbar 7 by the retraction force applied to the drawbar 7 in a state in which the positioning outer surface 28 of the turning tool 1B is in contact with the positioning strike receiving portion 29 of the ram 3, the drawbar 7 is retracted and slightly moved in a relative fashion, the tapered shank 5 is pressed to the mounting engagement unit 6, and the turning tool 1B is clamped/fixed in a state of dual-surface restraint.

In the tool mounting device for a turning center according to a third aspect, the first or second aspect, the positioning outer surface 28 is a tapered outer surface that slightly narrows toward the outer surface of the distal end portion of the turning tool 1B; the positioning strike receiving portion 29 for providing support thereto is also a slightly narrowing tapered receiving surface, and when the turning tool 1B is clamped/fixed, the positioning outer surface 28 strikes the positioning strike receiving portion 29 prior to the tapered shank 5 making pressured contact with the mounting engagement unit 6, and the tapered shank 5 exerts elastic pressure/contact on the mounting engagement unit 6 by the deformation of the bearing unit 2 in a state in which the positioning is restrained.

In the tool mounting device for a turning center according to a fourth aspect, the clamp mechanism 8 is configured so that the drawbar 7 is retracted by the retraction force produced by the elastic member 10 to actuate the clamping; and the drawbar 7 is returned by pressing/driving against the retraction force of the drawbar driving device 9 to release the clamping.

In the tool mounting device for a turning center according to a fifth aspect, the clamp mechanism 8 is provided with a wedge mechanism 18 for engaging a wedge 15 moved/driven by a wedge driving device 16 in a wedge engagement unit 17 and engaging/locking the retracted position of the drawbar 7 when the turning tool 1B is clamped/fixed.

In the tool mounting device for a turning center according to a sixth aspect, the tapered inner surface of the tapering portion 30 provided to the external end portion of the ram 3 acts as the positioning strike receiving portion 29, a drive key 32 with which a key groove 31 of the rotating tool 1A engages is provided to the external end portion of the main shaft 4, and the drive key 32 is disposed within the tapering portion 30; and the shape of drive key 32 substantially matches the shape of the positioning strike receiving portion 29 of the tapering portion 30, and soil deposits are prevented therebetween during working.

In the tool mounting device for a turning center according to a seventh aspect, a rotation-allowing clearance 33 between the drive key 32 and the tapering portion 30 is set to be low, or a brush is provided to one of the two, and soil deposits are prevented therebetween during working.

In the tool mounting device for a turning center according to an eighth aspect, the clamp mechanism 8 is configured so that the drawbar 7 is retracted by the retraction force produced by the elastic member 10 to actuate the clamping; and the drawbar 7 is returned by pressing/driving against the retraction force of the drawbar driving device 9 to release the clamping.

In the tool mounting device for a turning center according to a ninth aspect, the clamp mechanism 8 is provided with a wedge mechanism 18 for engaging a wedge 15 moved/driven by a wedge driving device 16 in a wedge engagement unit 17 and engaging/locking the retracted position of the drawbar 7 when the turning tool 1B is clamped/fixed.

In the tool mounting device for a turning center according to a tenth aspect, the clamp mechanism 8 is provided with a wedge mechanism 18 for engaging a wedge 15 moved/driven by a wedge driving device 16 in a wedge engagement unit 17, and engaging/locking the retracted position of the drawbar 7 when the turning tool 1B is clamped/fixed.

The configuration of the present invention as described above provides an innovative tool mounting device for a turning center whereby the deformation of the bearing unit is used so that a simple structure is devised and there is no need to perform special operations. When a cutting tool is clamped/fixed, the bearing unit is deformed by the retraction force of the drawbar because the cutting tool is supported by the ram, the tapered shank is automatically pressed to the mounting engagement unit in a state in which the cutting tool is supported by the ram, an automatic mechanical lock can be implemented in a state of dual-surface restraint, and the turning tool can be securely clamped/fixed.

In other words, there is provided an innovative tool mounting device for a turning center whereby the cutting tool can be automatically and securely clamped/fixed in a state of dual-surface restraint by retracting the drawbar, and powerful turning work can be performed in which a considerable radial load can be adequately withstood without damaging the bearing unit, without the use of specially designed tools, without implementing a complicated mechanical locking mechanism, and without special handling, In the second, third, and fourth aspects, an innovative tool mounting device for a turning center with excellent practical utility is provided in which even more remarkable operation and effects are demonstrated.

In the fifth aspect, an exceptionally innovative tool mounting device for a turning center is provided in which a dual-surface restraint is automatically engaged and locked by merely engaging/locking the retracted position of the drawbar in which the positioning outer surface and the positioning strike receiving portion have come into contact. Since the clamp can be securely fixed, it is possible to configure the clamp mechanism with an air cylinder device or the like without the use of a hydraulic device or another hydraulic drive source having a considerable drive force, and an oilless structure can be achieved and resources can be saved.

In the sixth and seventh aspects, an even more exceptional tool mounting device for a turning center is provided in which soil deposits are prevented and a protective cover therefor is not required, thereby allowing tool exchange time and costs to be further reduced by modifying the shape of the drive key while allowing powerful turning work with a dual-surface restraint to be performed.

BEST MODE FOR EMBODYING THE INVENTION

Figure 1:
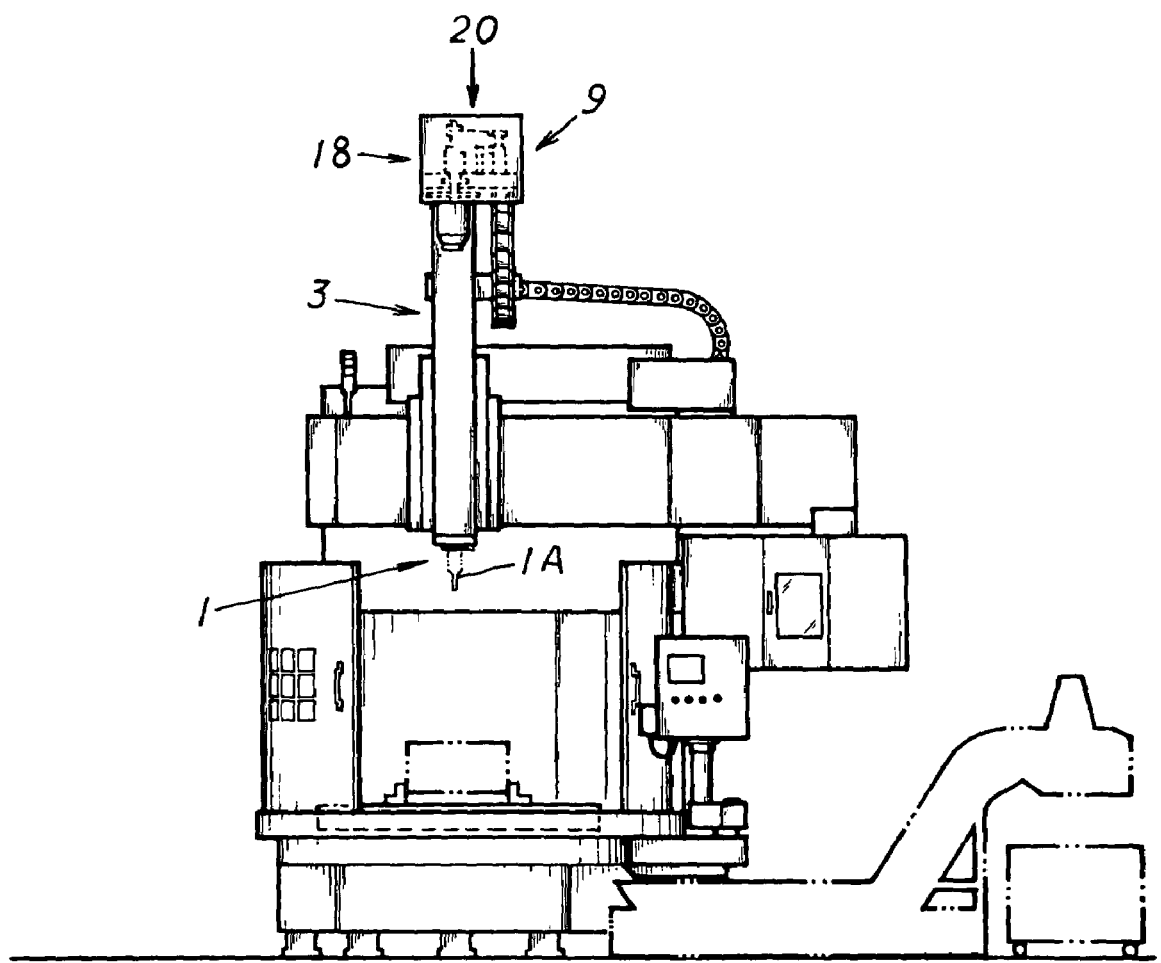
FIG. 1 is a schematic structural diagram of the turning center of the present example.
Figure 2:
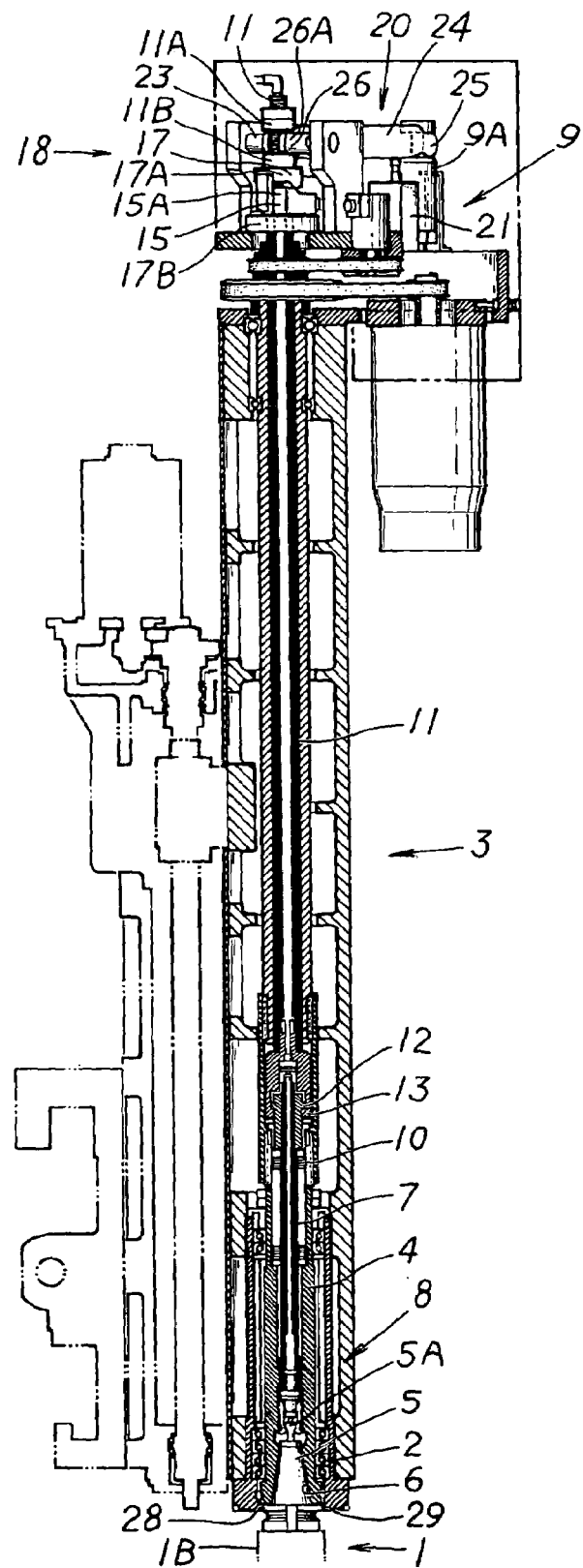
FIG. 2 is a schematic structural cross-sectional diagram of the turning center of the present example.
Figure 3:
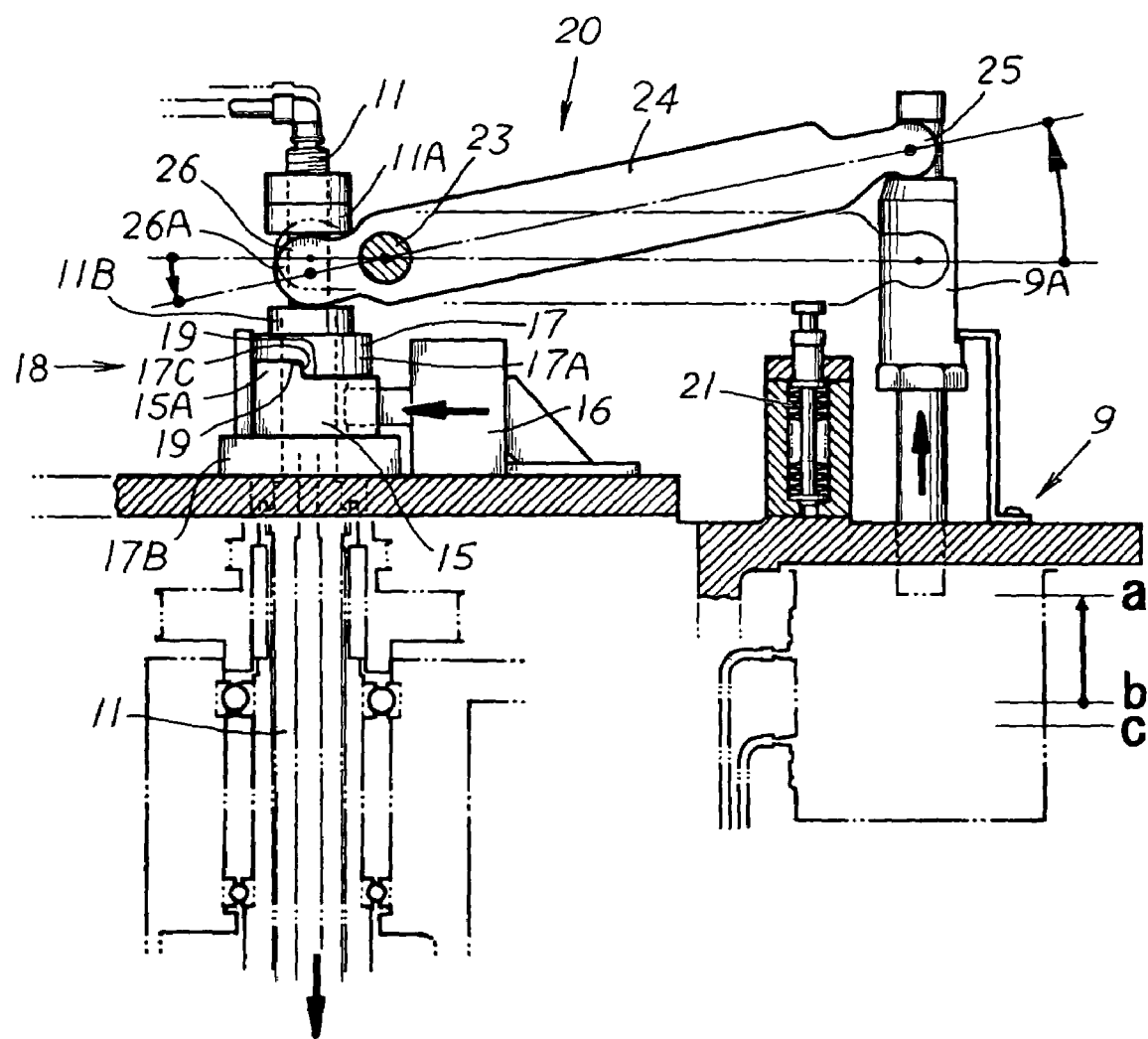
FIG. 3 is a partial descriptive diagram of the state in which the drawbar driving device of the turning center of the present example has been unclamped (release position).
Figure 4:
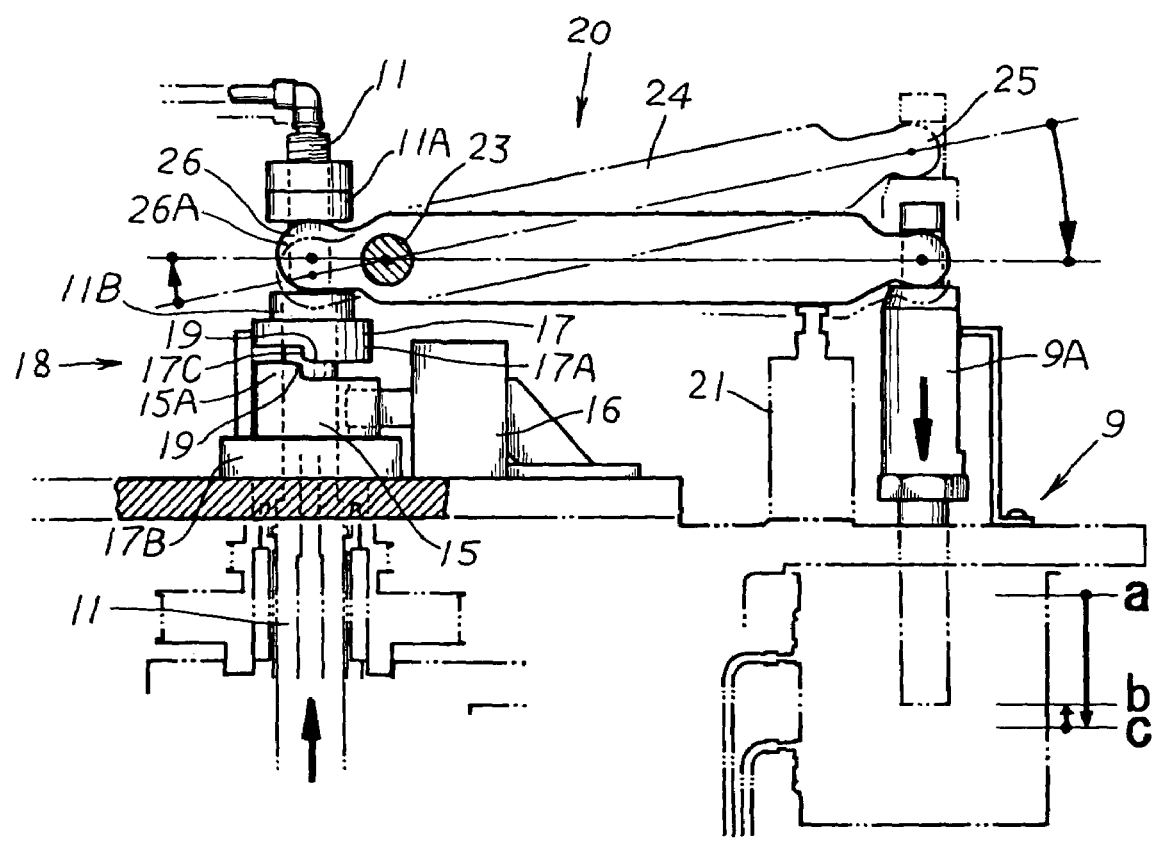
FIG. 4 is a partial descriptive diagram of the wedge mechanism in a release state in which the drawbar driving device of the turning center of the present example is actuated and clamped and the rotating tool is mounted (first clamp position).
Figure 5:
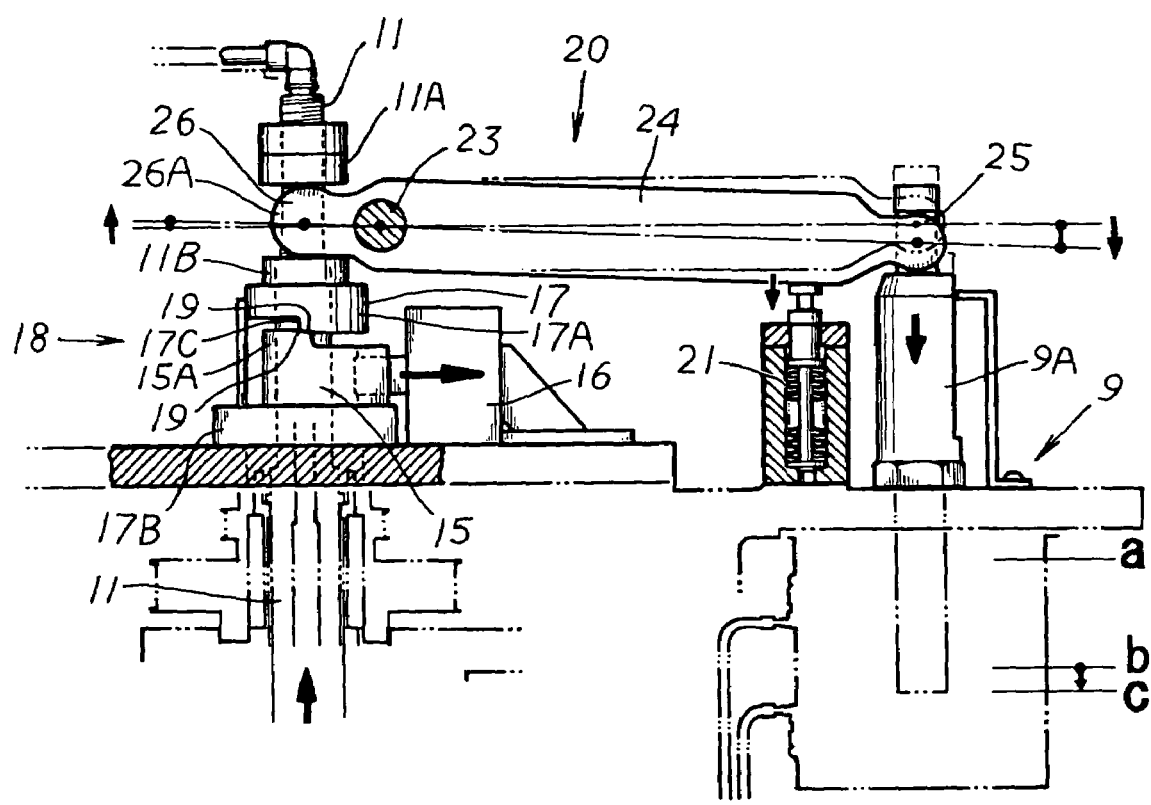
FIG. 5 is a partial descriptive diagram of the wedge mechanism in an operating state in which the drawbar driving device of the turning center of the present example is actuated and clamped and the turning tool is mounted (second clamp position).
Figure 6:
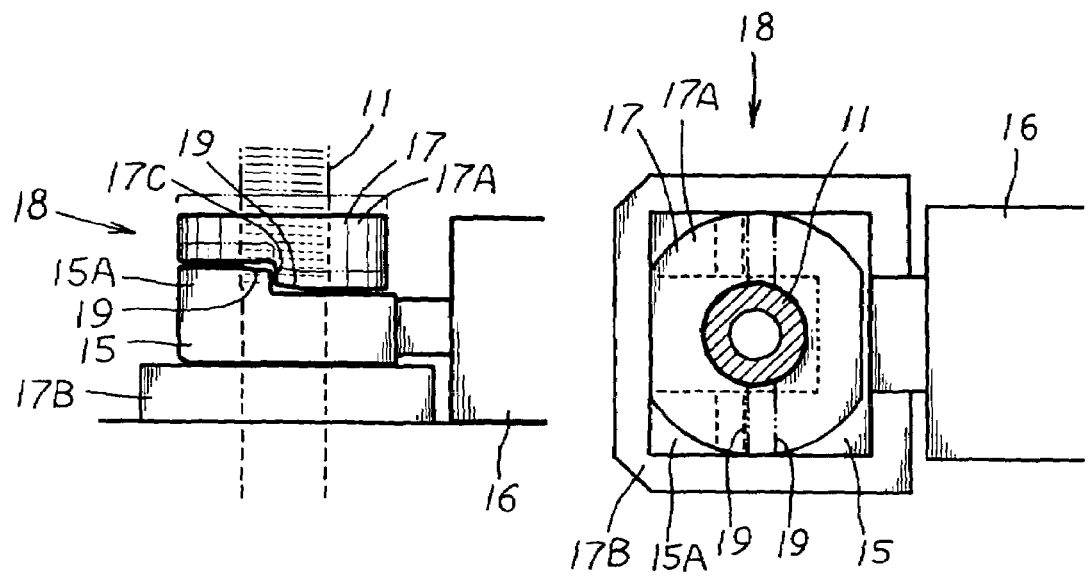
FIG. 6 is a descriptive diagram showing the release state of the wedge mechanism of the present example.
Figure 7:
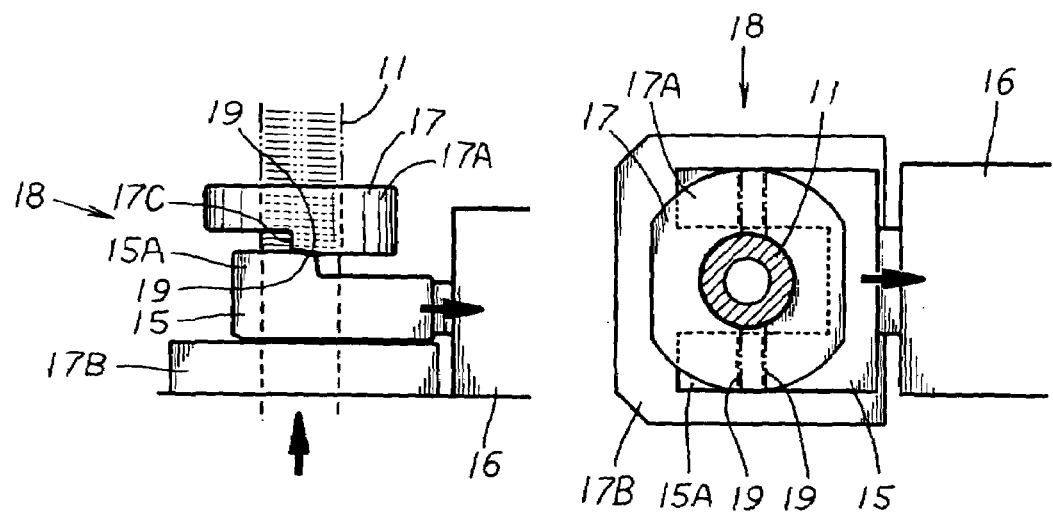
FIG. 7 is a descriptive diagram showing the operating state of the wedge mechanism of the present example.
Figure 8:
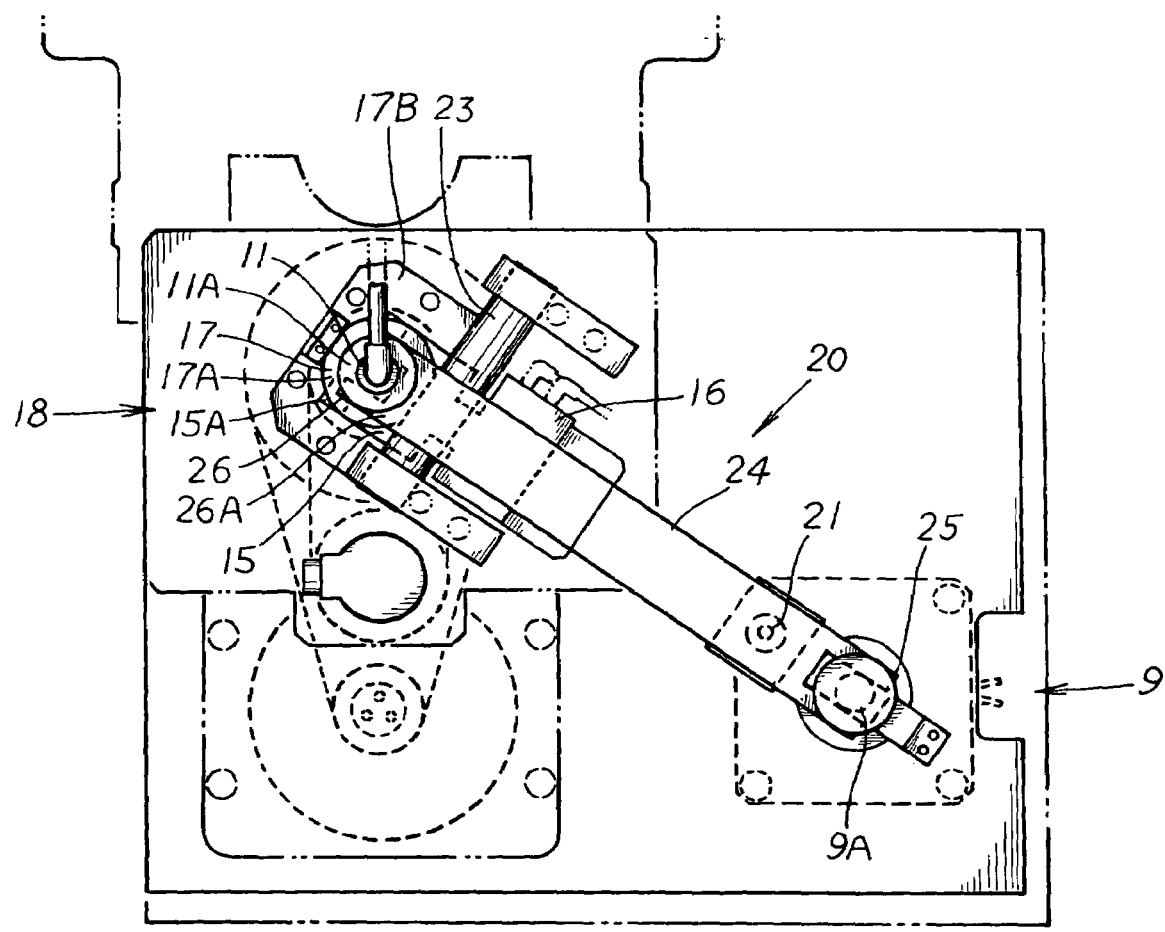
FIG. 8 is a descriptive plan view of the drawbar driving device of the turning center of the present example.
Figure 9:
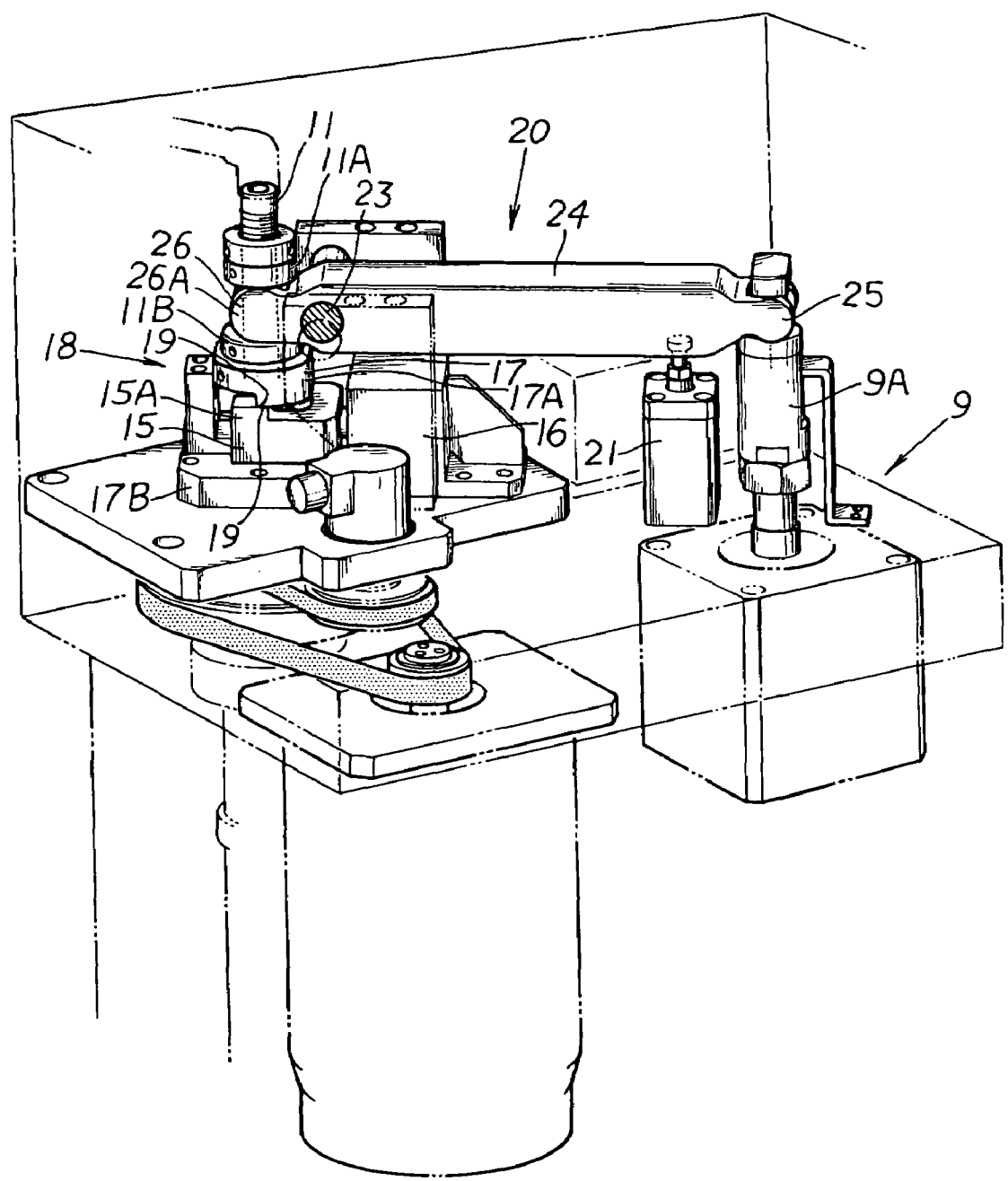
FIG. 9 is a descriptive perspective view of the second clamp position of the wedge mechanism, the lever mechanism, and the drawbar driving device of the turning center of the present example.
Figure 10A:
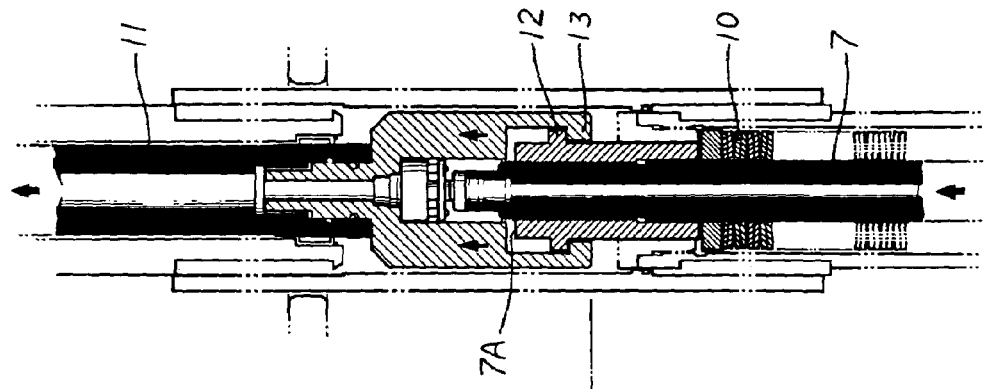
FIGS. 10A to 10C are descriptive cross-sectional diagrams of the clamp positions of the support unit provided to the reciprocating driver and the drawbar stopper of the turning center of the present example.
Figure 10B:
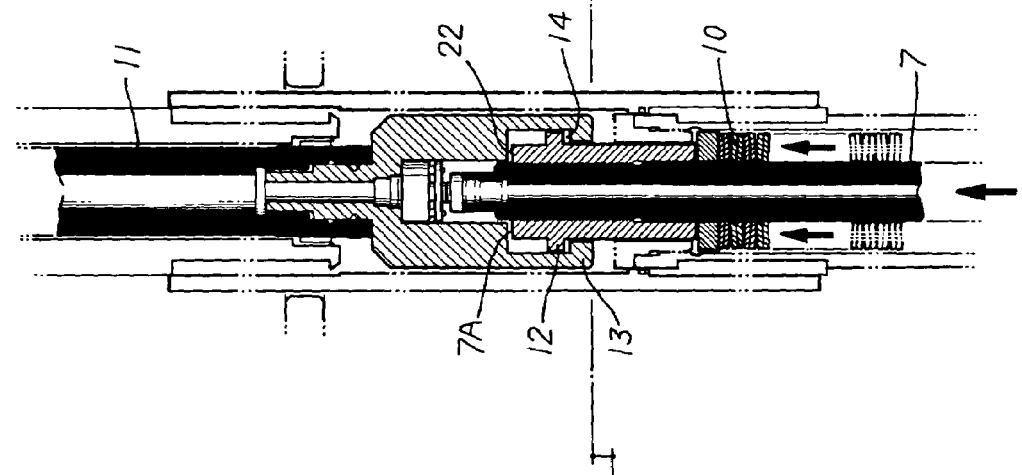
Figure 10C:
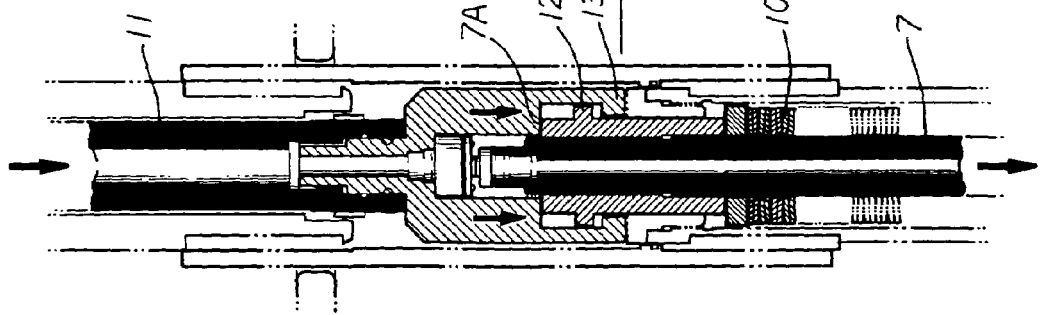
Figure 11:
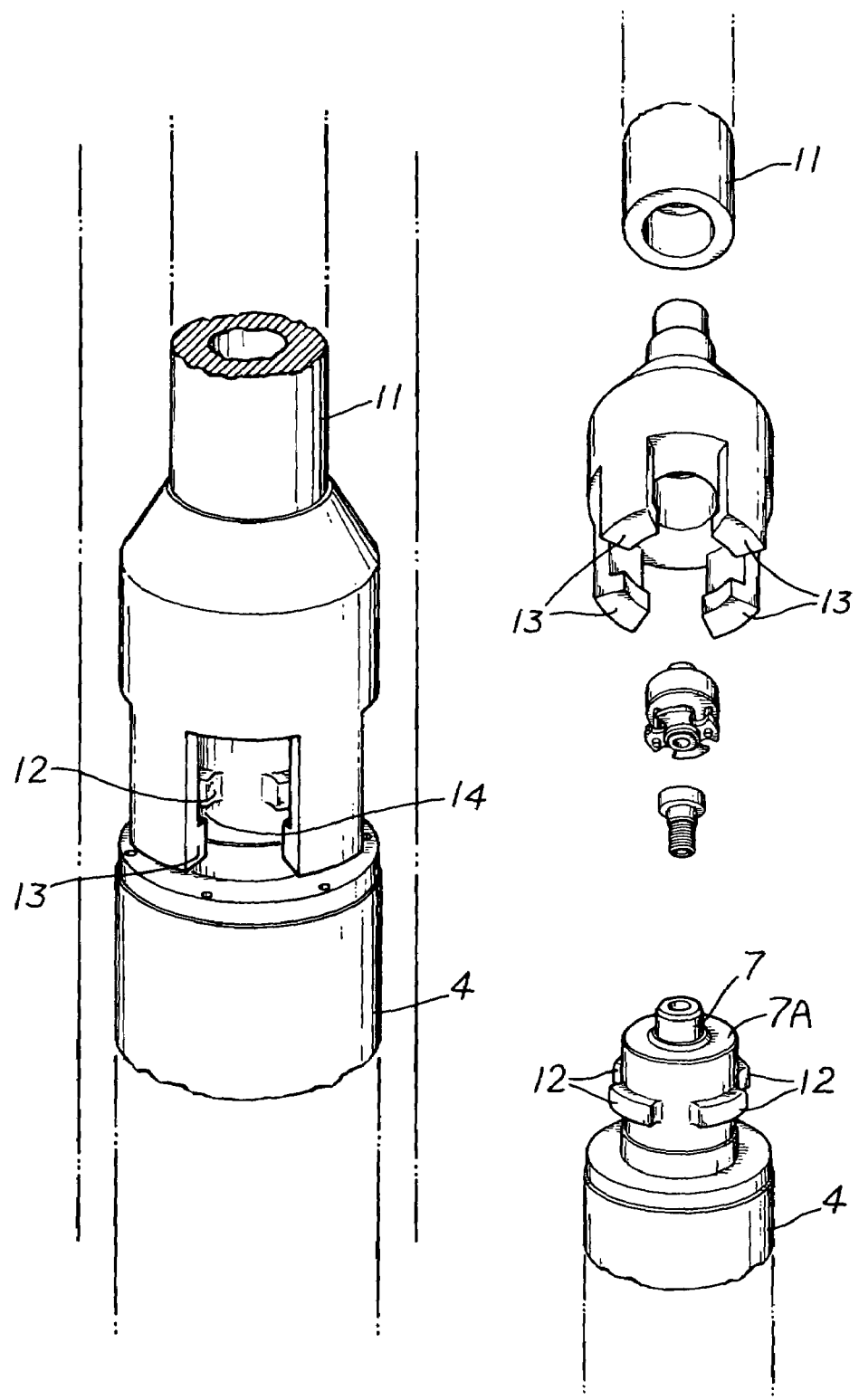
FIG. 11 is a descriptive perspective diagram of the reciprocating driver and drawbar of the turning center of the present example.
Figure 12:
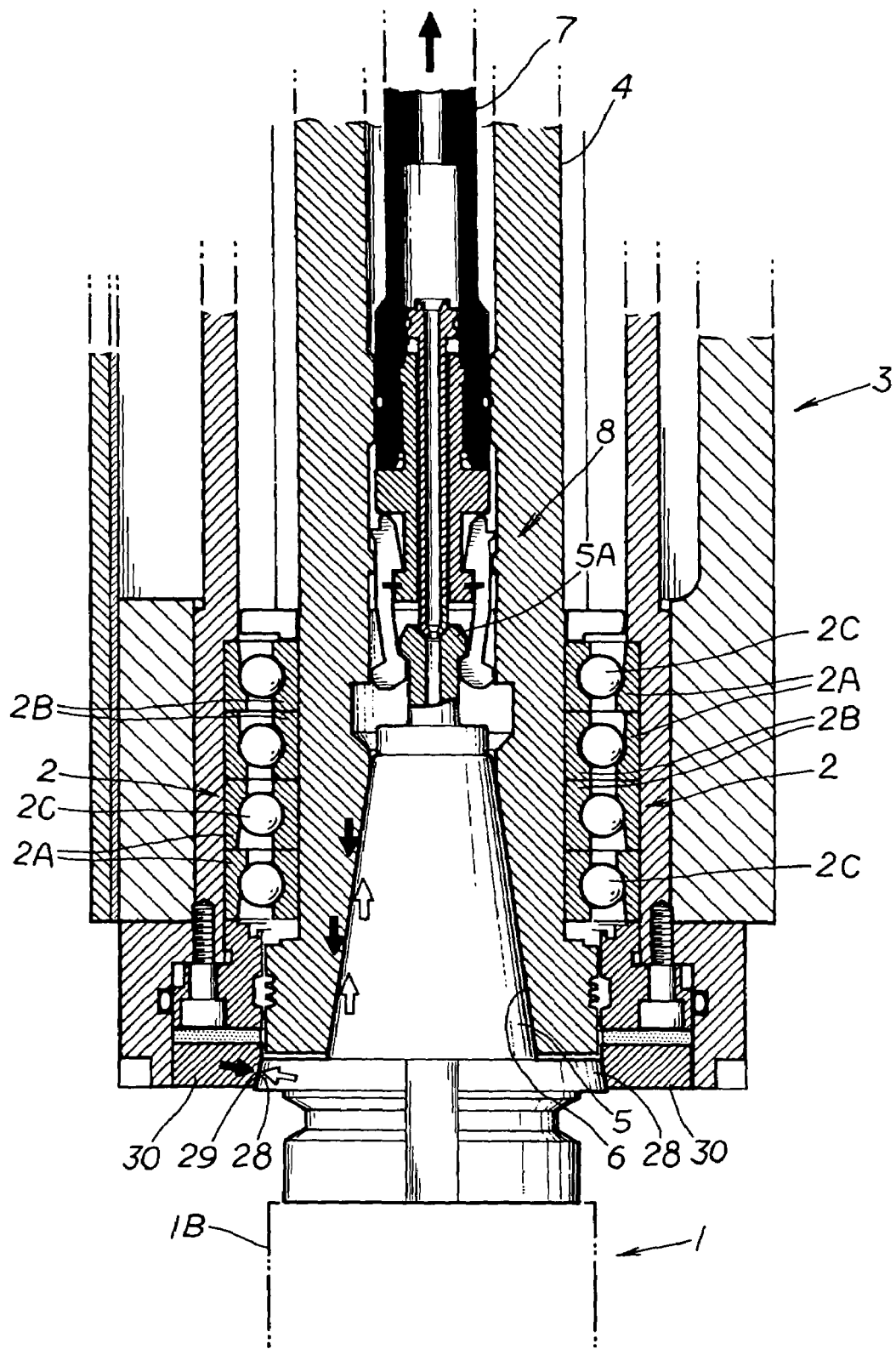
FIG. 12 is a descriptive cross-sectional diagram of the state in which the clamp mechanism of the turning center of the present example is actuated and clamped and the turning tool is mounted in a state of dual-surface restraint (second clamp position).
Figure 13:
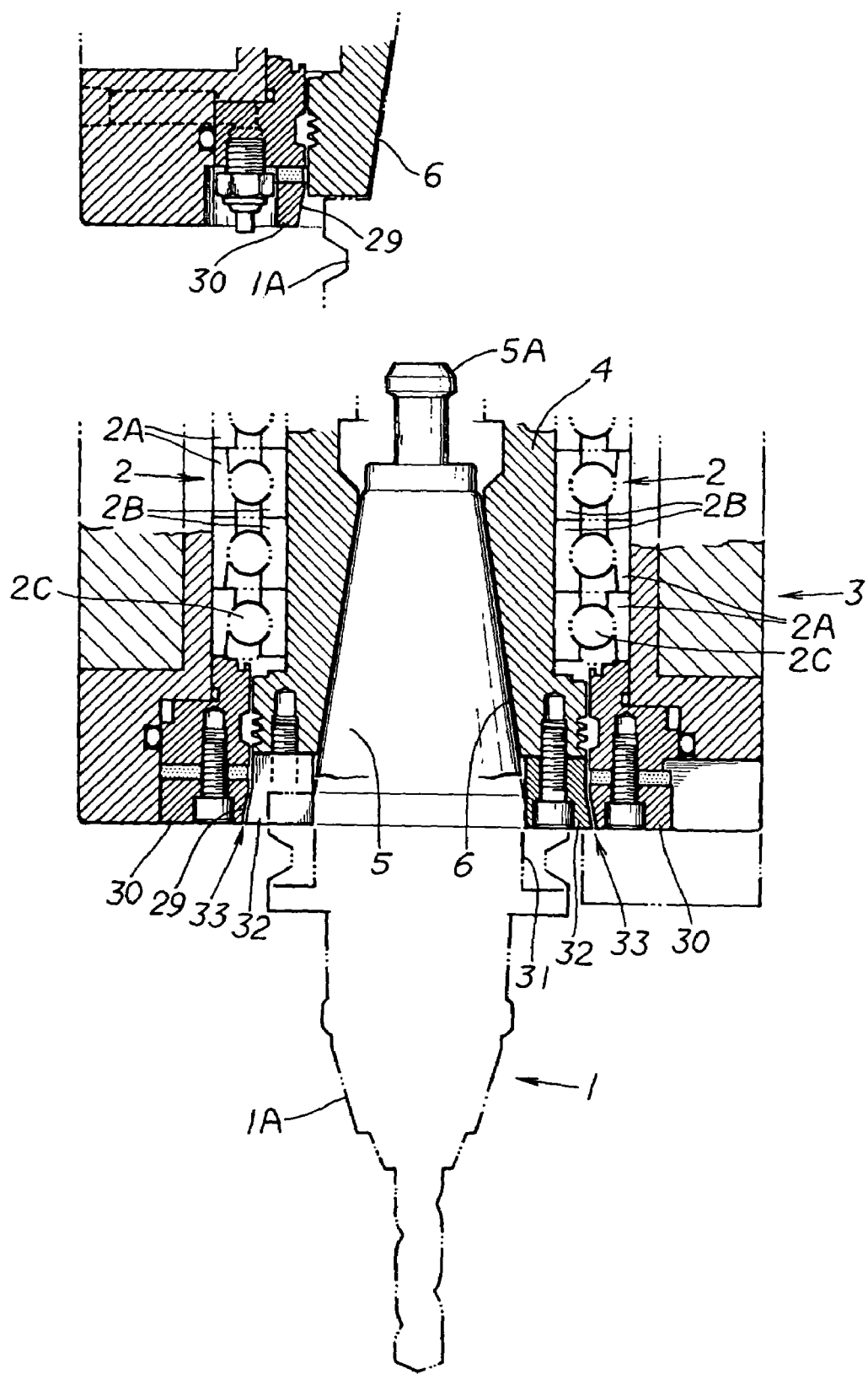
FIG. 13 is a descriptive cross-sectional diagram of the state in which the clamp mechanism of the turning center of the present example is actuated and clamped and the rotating tool is mounted (first clamp position).
Figure 14:
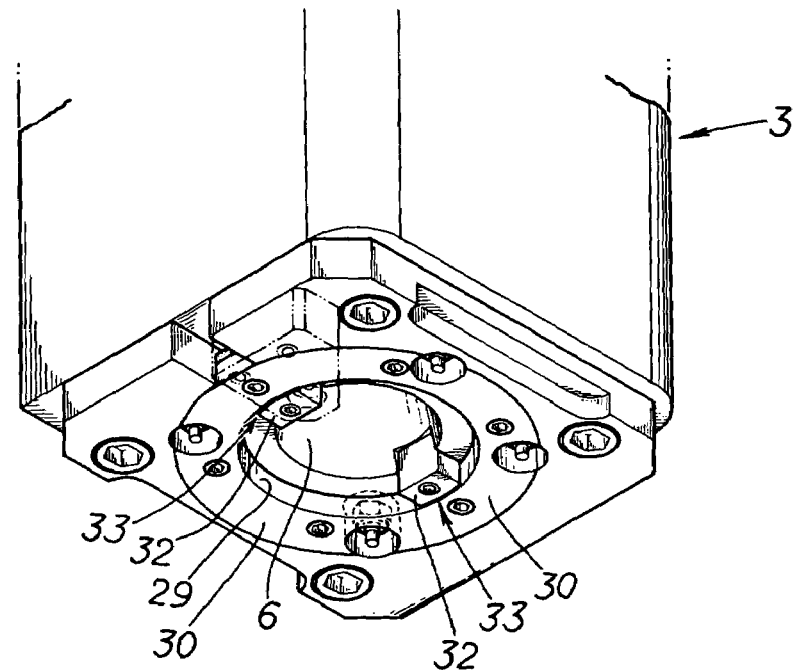
FIG. 14 is a descriptive perspective diagram of the tapered shank portion and the tool post of the turning center of the present example.
Figure 14:
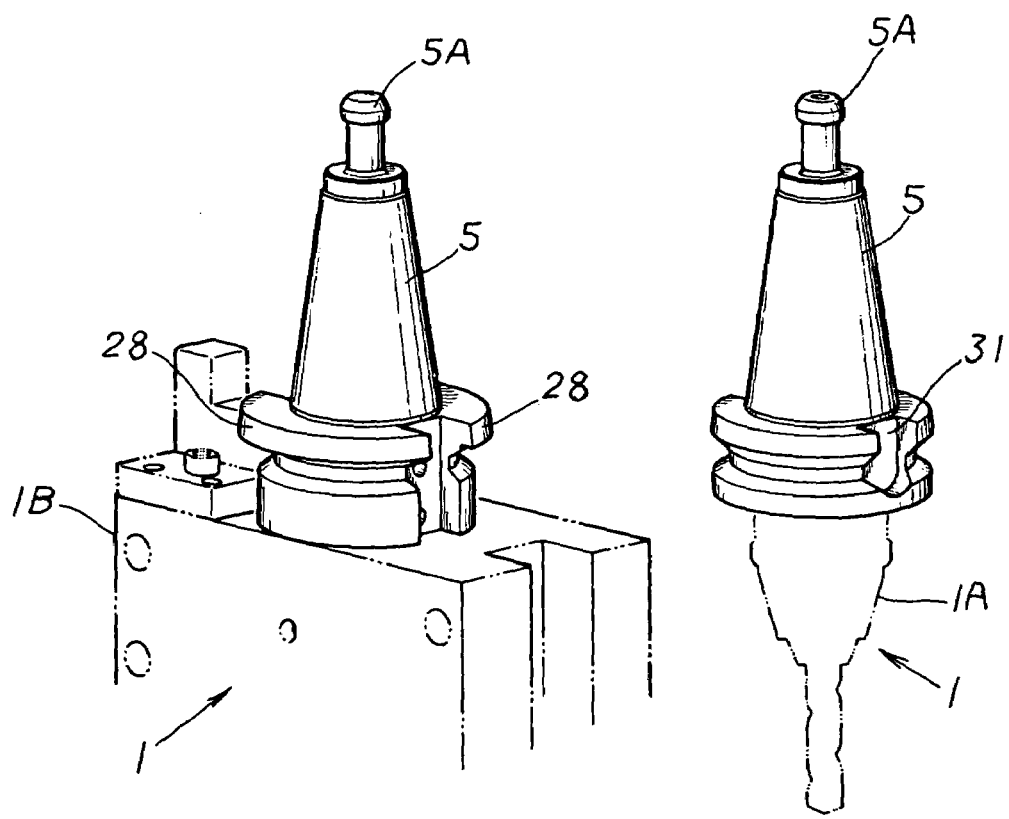

Embodiments (approaches for implementing the present invention) of the present invention thought to be advantageous are briefly described below on the basis of the diagrams to show the operation of the present invention.

When the clamp mechanism 8 begins the clamping operation and the drawbar 7 is retracted, the tapered shank 5 of the tool 1 is drawn to and engaged with the mounting engagement unit 6 provided to the main shaft 4, and the tool 1 is clamped/fixed.

Specifically, when a turning tool 1B is clamped/fixed, the clamp mechanism 8 operates in the same manner as rotating tool 1A, and the drawbar 7 is retracted, but in contrast to the case of a rotating tool 1A, the positioning outer surface 28 provided to the turning tool 1B strikes the positioning strike receiving portion 29 provided to the ram 3.

Therefore, the turning tool 1B is retracted, but the drawbar 7 cannot be retracted because the positioning outer surface 28 of the turning tool 1B strikes the positioning strike receiving portion 29.

In the present invention, however, the structure and arrangement of the bearing unit 2 are designed so that the bearing unit 2 is deformed in response to the retraction force of the drawbar 7 of the clamp mechanism 8, whereby the bearing unit 2 is deformed via a rotational clearance without being damaged by the additional retraction force of the drawbar 7 in a state which the turning tool 1B is restrained as described above. The main shaft 4 is slightly moved in the reverse direction from the drawbar 7 by the deformation of the bearing unit 2.

More specifically, the retracted position of the drawbar 7 does not vary, but the drawbar 7 retracts a little further (slight movement) in a relative fashion due to the slight reverse movement of the main shaft 4.

In other words, an innovative tool mounting device for a turning center can be obtained whereby the mounting engagement unit 6 of the main shaft 4 presses on and makes elastic pressure/contact with the tapered shank 5 of the turning tool 1B due to the slight movement of the main shaft 4. Hence, the turning tool 1B is configured so that the tapered shank 5 lands on the mounting engagement unit 6 in a state in which the positioning outer surface 28 and the positioning strike receiving portion 29 have made contact, and a simple configuration can be achieved by engaging/locking the clamped state (clamp retracted position) by using a wedge mechanism 18 or the like, for example. The turning tool 1B can be automatically and securely clamped/fixed in a state of dual-surface restraint by a method in which the drawbar 7 is retracted by actuating/operating the clamp in a conventional manner without the implementation of a complicated mechanical lock mechanism, and without special handling. Powerful cutting work that can adequately withstand considerable radial force can be performed without damaging the bearing unit 2.

Additionally, by configuring the device to engage/lock the retracted position of the drawbar 7 as described above, the clamp mechanism can be configured with an air cylinder device or the like without the use of a hydraulic device or another hydraulic drive source having a considerable drive force, an oilless structure can be achieved, and resources can be saved. This is because a dual-surface restraint is automatically locked and strong clamping/fixing can be achieved by merely engaging/locking the retracted position of the drawbar 7 in which the positioning outer surface 28 and the positioning strike receiving portion 29 have made contact.

An even more exceptional tool mounting device for a turning center is provided in which soil deposits are prevented and a protective cover therefor is not required, thereby allowing tool exchange time and costs to be further reduced. This is achieved by modifying the shape of the drive key 32 that engages the key groove 31 when a rotating tool 1A is clamped/fixed, making the shape substantially match the positioning strike receiving portion 29 of the tapering portion 30, setting the gap to be as narrow as possible, providing the gap with a brush, or providing another configuration by modifying the shape of the drive key while allowing powerful turning work with a dual-surface restraint to be performed.

EXAMPLES

Detailed examples of the present invention are described below with reference to the diagrams.

A mounting engagement unit 6 for inserting/engaging a tapered shank 5 mounted on the base end portion of a tool 1 is provided to the distal end (lower end) of a main shaft 4 rotatably provided to a ram 3 via a bearing unit 2. A clamp mechanism 8 is provided for clamping the clamping convexity 5A of the tapered shank 5 when the drawbar 7 is retracted, and drawing/engaging the tapered shank 5 to the mounting engagement unit 6 to mount/fix the tool 1 on the main shaft 4 so as to allow the shank to be clamped and released based on the reciprocating control of the drawbar 7. In the present example, clamping is actuated by a configuration in which an elastic member 10 is fitted to the drawbar 7 and is used as a compression-resisting elastic unit for retracting (upwardly pushing) the drawbar 7 against the main shaft 4 during compression. The drawbar 7 is retracted using the retracting force of the elastic member 10 to actuate the clamping. Clamping is released by a configuration in which the drawbar 7 is returned via a reciprocating driver 11 (pushrod) by a pushing/driving operation directed against the retracting force of the air cylinder device 9 as the drawbar driving device 9.

In other words, in the present example, the clamp mechanism 8 is configured so that a spring force produced by a strut against the drawbar 7 is generated against the main shaft 4 by the elastic member 10, and because of the retraction force, the clamp is fixed by the retraction applied to the main shaft 4 of the drawbar 7; and the clamp is released by the return pushing/driving of the air cylinder device 9 against the retraction force.

In the present example, the vicinity of the aperture of the mounting engagement unit 6 at the distal end of the ram 3 is provided with a positioning strike receiving portion 29 that receives contact from the positioning outer surface 28 provided to the external surface of the base end side of the turning tool 1B when the turning tool 1B is clamped/fixed. The structure and arrangement of the bearing unit 2 are set so that the positioning outer surface 28 strikes the positioning strike receiving portion 29 when the drawbar 7 is retracted, and the bearing unit 2 deforms via a rotational clearance in response to the retraction force applied to the drawbar 7 by the clamping action of the clamp mechanism 8 because the retracted position of the drawbar 7 is maintained in the struck state, and the mounting engagement unit 6 exerts elastic pressure/contact on the tapered shank 5.

More specifically, the bearing unit 2 of the present example comprises ram fixing portions 2A for conventionally fixing the unit to the ram 3, main shaft-fixed portions 2B for fixing the unit to a rotating main shaft 4, and bearing balls 2C that are rotatably interposed therebetween; and is configured so that the drawbar 7 is retracted, the main shaft-fixed portions 2B of the bearing unit 2 are slightly moved in the return direction of the drawbar 7 by the retraction force applied to the drawbar 7 in a state in which the positioning outer surface 28 of the turning tool 1B is in contact with the positioning strike receiving portions 29 of the ram 3, the drawbar 7 is retracted and slightly moved in a relative fashion, the tapered shank 5 is pressed to the mounting engagement unit 6, and the turning tool 1B is clamped/fixed in a state of dual-surface restraint.

The positioning outer surface 28 is a tapered outer surface that slightly narrows toward the outer surface of the distal end portion of the turning tool 1B, and the positioning strike receiving portion 29 for providing support thereto is also a slightly narrowing tapered receiving surface. In other words, in the present example, the tapered inner surface of the tapering portion 30 provided to the vicinity of the aperture of the mounting engagement unit 6 of the ram 3 acts as the positioning strike receiving portion 29, and the positioning outer surface 28 of the turning tool 1B is supported in tapered fashion by the positioning strike receiving portion 29 and is temporarily positioned and stopped. Simply retracting/holding this state provides no more than single-surface restraint and does not allow the configuration to withstand a considerable radial load. In the present example, however, when the turning tool 1B is clamped/fixed, the positioning outer surface 28 strikes the positioning strike receiving portion 29 prior to the tapered shank 5 making pressured contact with the mounting engagement unit 6 as described above, the bearing unit 2 is deformed by the retraction force of the drawbar 7 produced by the elastic member 10 in a state in which the positioning is restrained, and the tapered shank 5 exerts elastic pressure/contact on the mounting engagement unit 6 due to this deformation.

In more-specific terms, the bearing unit 2 is deformed via the rotational clearance by the additional retracting force of the drawbar 7 without being damaged in a state in which the turning tool 1B is restrained as described above, and the main shaft 4 is slightly moved in the reverse direction from the drawbar 7 by the deformation of the bearing unit 2.

In other words, the retracted position of the drawbar 7 does not vary, but the drawbar 7 retracts slightly in a relative fashion (slight movement) because the main shaft 4 moves slightly in the reverse direction.

That is to say, the mounting engagement unit 6 of the main shaft 4 exerts elastic pressure/contact on the tapered shank 5 of the turning tool 1B because of the slight movement of the main shaft 4. The turning tool 1B is therefore configured so that the tapered shank 5 lands on the mounting engagement unit 6 in a state in which the positioning outer surface 28 and the positioning strike receiving portion 29 have made contact.

The clamp mechanism 8 is provided with a wedge mechanism 18 for engaging a wedge 15 moved/driven by a wedge driving device 16 in a wedge engagement unit 17 and engaging/locking the retracted position of then drawbar 7 when the turning tool 1B is clamped/fixed.

A dual-surface restraint is automatically engaged/locked by simply engaging/locking the retracted position of the drawbar 7 in which the positioning outer surface 28 and the positioning strike receiving portion 29 have come into contact, and the clamp is securely fixed. It is therefore possible to configure the clamp mechanism with an air cylinder device or the like without the use of a hydraulic device or another hydraulic drive source having a considerable drive force, and an oilless structure can be achieved and resources can be saved.

Therefore, the drive mechanism of the drawbar 7 of the clamp mechanism 8 may be configured in any manner, and retraction may be carried out using the retraction force of an elastic member 10, as described in the present example, or retraction/driving may be carried out using a driving mechanism. However, the present example is configured so that the positioning outer surface 28 of the turning tool 1B is engaged and supported on the positioning strike receiving portion 29 by the retraction produced by the elastic member 10. This retraction causes the bearing unit 2 to deform, the main shaft 4 to move backward against the drawbar 7, and the tapered shank 5 to land on the mounting engagement unit 6.

By engaging/locking the clamp position with the wedge mechanism 18 so that the drawbar 7 is prevented from returning to the retracted position, the turning tool 1B is clamped/fixed in a state of dual-surface restraint, and a considerable radial load can be adequately countered. This is because in this state the return blocking state is engaged even if both the drive source for the wedge mechanism 18 and the drive source for the clamp mechanism 8 are configured with an air cylinder.

Therefore, the tapered shank 5 and the mounting engagement unit 6 are automatically elastically attached to form a dual-surface restraint, and the turning tool 1B can be securely clamped/fixed without special handling, without the use of a complicated mechanical lock mechanism, and without the use of specially designed tools. This is achieved by simply forming a positioning strike receiving portion 29 on the ram 3 to allow the slightly-tapered positioning outer surface 28 formed on the turning tool 1B to be supported, and setting the appropriate structure and arrangement of the bearing unit 2.

Additionally, engaging/locking takes place so that the wedge mechanism 18 blocks the return of the drawbar 7. Accordingly, the clamp mechanism 8 can be configured with an air cylinder, which does not require considerable retraction force, nor requires a drive force to be applied against a considerable retraction force, and an oilless structure can be achieved.

In the design of the bearing unit 2, the position of the bearing unit 2 is more specifically at the distal end side of the ram 3 and the main shaft 4, for example, and the bearing unit may be designed to be deformable by setting or otherwise configuring the receiving surface of the bearing balls 2C so that the main shaft-fixed portions 2B move slightly downward when the retraction of the retracted drawbar 7 is locked by bringing the positioning outer surface 28 into contact with the positioning strike receiving portion 29.

In the present example, a drive key 32 with which a key groove 31 of the rotating tool 1A engages is provided to the external end portion of the main shaft 4, the drive key 32 is disposed within the tapering portion 30, the shape of drive key 32 substantially matches the shape of the positioning strike receiving portion 29 of the tapering portion 30, and soil is prevented from being deposited therebetween during working.

In other words, the shape of the external surface of the drive key 32 is set to the extent possible so as to be in close proximity with the surface of the positioning strike receiving portion 29, and the device may be configured so that the rotation-allowing clearance 33 between the drive key 32 and the positioning strike receiving portion 29 of the tapering portion 30 is reduced or a brush is provided to one of the two to prevent soil from depositing therebetween during working.

Described below is the clamp mechanism 8 of the present example.

The clamp mechanism 8 of the present example, even though it is a shared clamp mechanism, is configured to provide an innovative tool mounting device for a turning center, whereby the locking effect of the wedge mechanism 18 is reliably demonstrated without interfering with the rotation of a rotating tool 1A, a considerable load during operation of the turning tool 1B can be adequately countered even when a small drive source is used to enable an oilless structure in which, for example, an air cylinder device is used, and clamping/fixing can be securely performed. This can be achieved by simply changing the cylinder position of the drive device.

In other words, the present invention provides an innovative tool mounting device for a turning center in which a cylinder device 9 acting as a drawbar drive device 9 has a first clamp position b and a second clamp position c in relation to a release position a; a rotation allowance gap 14 is specifically maintained between a stopper 12 and the support unit 13 in the first clamp position b to clamp/fix the rotating tool 1A; in the second clamp position c the reciprocating driver 11 is driven by an amount equal to the rotation allowance gap 14; and when the support unit 13 and the stopper 12 are brought into contact and a load is imposed, the stopper 12 is supported/stopped by the support unit 13, and the reciprocating driver 11 is engaged/locked by the wedge mechanism 18 in the position of the return blocking state in which the return of the drawbar 7 is blocked. Even though the configuration has a shared clamp mechanism 8, an innovative tool mounting device for a turning center can be designed by simply changing the cylinder position of the drive device whereby the locking effect of the wedge mechanism 8 is reliably demonstrated without interfering with the rotation of the rotating tool 1A, a considerable load during the processing of a turning tool 1B can be adequately countered even when a small drive source is used to enable an oilless structure in which, for example, an air cylinder device 9 is used, and clamping/fixing can be securely performed.

More specifically, the drawbar 7 that rotates together with the main shaft 4 is rotatably mounted on the reciprocating driver 11 (pushrod) driven by the air cylinder device 9 and is caused to push/drive the drawbar 7. A stopper 12 is provided to a drawbar driver 7A that is pushed by the reciprocating driver 11 of the base end portion of the drawbar 7, and a support unit 13 for supporting the stopper 12 and blocking the drawbar 7 from returning from the retracted clamp position (clamp fix position) of the drawbar 7 is provided to the reciprocating driver 11. The stopper 12 is configured so as to make no contact with the support unit 13 and to maintain a rotation allowance gap 14 therebetween when the drawbar 7 is retracted by the retracting force of the elastic member 10 to clamp/fix a rotating tool 1A, and is configured so as to be brought to a return blocking state in which the reciprocating driver 11 is retracted by the air cylinder device 9 by an amount equal to the rotation allowance gap 14, and the stopper 12 can support the support unit 13 when a turning tool 1B is clamped/fixed.

A wedge mechanism 18 is provided in which a reciprocatingly movably disposed wedge 15 is moved/driven by a wedge driving device 16 (an air cylinder device 16 is adopted to obtain an oilless structure) to engage a wedge engagement unit 17 and to engage/lock the retracted clamp position of the drawbar 7 in a state in which the reciprocating driver 11 is retracted and brought to a return blocking state. The air cylinder device 9 has a release position a for pushing/driving the drawbar 7 against the retracting force of the elastic member 10 and releasing the clamp on the rotating tool 1A and turning tool 1B, a first clamp position b for clamping/fixing the rotating tool 1A by the retracting force of the elastic member 10, and a second clamp position c for clamping/fixing the turning tool 1B by moving the stopper 12 into a return blocking state that allows the support unit to be supported in a state in which this position is engaged/locked by the wedge mechanism 18.

More specifically, the clamp mechanism 8 and wedge mechanism 18 have a configuration in which the support unit 13 is provided to the lower end of the reciprocating driver 11 (pushrod) in a state facing the retracting direction side of the drawbar 7 of the stopper 12 which moves together with the reciprocating movement of the drawbar 7; the stopper 12 makes no contact with the support unit 13 and maintains the rotation allowance gap 14 in the first clamp position b for clamping/fixing the rotating tool 1A; the reciprocating driver 11 moves by an amount equal to the rotation allowance gap 14, the support unit 13 makes contact with the stopper 12, and the stopper 12 is brought to a return blocking state which allows the support unit 13 to be supported in the second clamp position c for clamping/fixing the turning tool 1B; and the wedge 15 is moved by the wedge driving device 16 in which an air cylinder device 9 is adopted for the wedge engagement unit 17 provided to the reciprocating driver 11, and the retracted position of the reciprocating driver 11 brought to an engaged return blocking state is engaged/locked.

Therefore, the driving of a rod 9A of the air cylinder device 9 drives the reciprocating driver 11 (pushrod) by way of a lever mechanism 20 to be described later, the drawbar driver 7A at the upper end of the drawbar 7 is pushed, and the drawbar 7 is returned. In other words, the air cylinder device 9 pushes the drawbar driver 7A by pushing/driving the reciprocating driver 11, and returns the drawbar 7 against the action of the elastic member 10. When a rotating tool 1A is clamped/fixed, the reciprocating driver 11 is pushed back by the drawbar driver 7A under the retracting force of the elastic member 10 brought about by the drive release or the driving of the air cylinder device 9 in the retracting direction while the drawbar 7 is retracted so that the drawbar 7 and the drawbar driver 7A are retracted to the clamp fixing position. The reciprocating driver 11 is then retracted further, the air cylinder device 9 is brought to the first clamp position b, and a rotation allowance gap 22 is thereby maintained between the drawbar driver 7A and the reciprocating driver 11 as well.

More specifically, a rotating tool 1A is clamped/fixed by bringing the air cylinder device 9, which serves as the drawbar driving device 9 of the clamp mechanism 8, from the release position a to the first clamp position b. In this case, the drawbar 7 is retracted by the retracting force of the elastic member 10 from the release position to which the tool has been returned by the reciprocating driver 11. In other words, the drawbar 7 pushes back the reciprocating driver 11 while being retracted by the elastic member 10, and the tapered shank 5 of the rotating tool 1A is retracted to the mounting engagement unit 6 and is brought at the clamp position for engagement.

At this time, the drawbar 7 and reciprocating driver 11 remain in contact, and the stopper 12 provided to the drawbar driver 7A of the drawbar 7, and the support unit 13 provided to the reciprocating driver 11 remain separated.

The clamp is already fixed in this state, but by setting the air cylinder device 9 to the first clamp position b, the reciprocating driver 11 is returned somewhat further and separated from the drawbar 7, and the rotation allowance gap 22 is maintained. The support unit 13 provided to the reciprocating driver 11 approaches the stopper 12, but a rotation allowance gap 14 is still maintained between the stopper 12 and the support unit 13 as well.

Therefore, in the first clamp position b for clamping/fixing the rotating tool 1A, the drawbar 7 is retracted by the elastic member 10 to the clamp fixing position, the stopper 12 and support unit 13 are separated, and the rotation allowance gap 14 is maintained. The reciprocating driver 11 and drawbar 7 are separated, a state is maintained in which the rotating member is reliably separated from the cylinder device 9 or the reciprocating driver 11 driven thereby, and the main shaft 4 (and drawbar 7) to which the rotating tool 1A is clamped/fixed makes no contact and is allowed to rotate.

The case of clamping/fixing the turning tool 1B is different from the case involving the rotating tool 1A in that a considerable radial load must be withstood.

In view of the above, a wedge mechanism 18 that is capable of adequately countering the radial load even with an air cylinder device having a low driving force is provided in the present example, and the use of a large hydraulic cylinder that can ensure clamping/fixing with considerable driving force is not required. The clamp fixing position of the drawbar 7 is engaged/locked by the wedge mechanism 18.

However, the lock mechanism does not operate if the clamp fixing position of the drawbar has been simply engaged/locked. In other words, the configuration of a turning center is different from that of a simple lathe, and a rotating tool is also clamped, fixed, and rotated. Therefore, the tool must be rotatably configured with no connection between the drive mechanism of the clamp mechanism 8 and the drawbar 7 that rotates together with the main shaft 4. For this reason, the rotation allowance gap 14 between the stopper 12 and support unit 13 is maintained as described above in the first clamp position b for clamping/fixing the rotating tool 1A, and the rotation allowance gap 22 between the reciprocating driver 11 and drawbar 7 is also maintained. Therefore, even if engaging/locking takes place while the rotation allowance gap 14 and rotation allowance gap 22 are maintained, a locking effect cannot be obtained.

In view of the above, when the turning tool 1B is clamped/fixed in the present example, the device is brought not to the first clamp position b, but to the second clamp position c to which the reciprocating driver 11 has been further driven back. As a result, the reciprocating driver 11 is further retracted and the support unit 13 then makes contact with the stopper 12. The wedge 15 of the wedge mechanism 18 engages the wedge engagement unit 17 at the position of a return blocking state in which the stopper 12 supports/stops the support unit 13, and the return blocking state is engaged/locked.

Therefore, even if the drawbar driving device 9 for driving/controlling the reciprocating driver 11 constitutes the air cylinder device 9, the clamp fixing position of the drawbar 7, at which the turning tool 1B is clamped/fixed, is engaged/locked in the position of the reciprocating driver 11 in a return blocking state in which the stopper 12 is supported by the support unit 13. This state is maintained even if the urging force of the elastic member 10 that retracts/urges the drawbar 7 is not adequately large to counter the considerable radial load generated when the turning tool 1B is in operation, thereby allowing a considerable radial load to be endured.

Specifically, the wedge mechanism 18 provided to the clamp mechanism 8 forms a tapered wedge surface 19 that is inclined in relation to the reciprocating direction of the wedge 15 on the pressing/engagement unit of the wedge 15 and the wedge engagement unit 17. In other words, the wedge engagement unit 17 fixes to the reciprocating driver 11 a forming member 17A that forms the wedge engagement unit and is reciprocatingly linked to the reciprocating driver 11 (pushrod). A concavity or hole into which the wedge 15 can be reciprocatingly inserted is formed by the forming member 17A and the bearing unit 17B of the reciprocating driver 11. The tapered surface 19 is formed on one of the inside surfaces of the engagement unit (concavity or hole), and the other surface is made to be a straight surface (in the present example, a tapered surface 19 is formed on the forming member 17A, and the end surface opposing the forming member 17A of the immobile bearing unit 17B is a straight surface), and one of the outside surfaces of the wedge 15 is made to be a straight surface so as to reciprocatingly guide the aforementioned straight surface. A tapered surface 19 for contacting the tapered surface 19 is formed on the outside surface of the opposing side.

Therefore, the wedge 15 moves and the tapered surfaces 19 contact each other under pressure, whereby the wedge 15 is not merely inserted/fitted, but is wedged and locked.

When the wedge 15 moves and pushes/engages (wedges/stops) the wedge engagement unit 17, the retracted clamp position of the reciprocating driver 11 (second clamp position) is engaged/maintained, and the turning tool 1B is securely mounted/fixed to the ram 3. The shapes of the wedge engagement unit 17 and the wedge 15 are set so as to form a clamp/release space that allows the reciprocating driver 11 to move in the clamp release direction, which is the opposite direction from the clamping direction when the wedge is returned.

More specifically, a stepped portion 17C in which the opposing distance to the end surface of the bearing unit 17B is varied is provided to the forming member 17A that forms the wedge engagement unit, and a convexity 15A is formed on the wedge 15, whose distal end surface forms a pushing/engagement unit. When the wedge 15 is retracted and driven by the wedge driving device 16 in the direction orthogonal to the reciprocating direction of the reciprocating driver 11, the convexity 15A of the wedge 15 rides up on the stepped portion 17C, and the tapered surface 19 provided in the vicinity of the stepped portion 17C, and the tapered surface 19 provided to the distal end surface of the convexity 15A make contact with each other, and become wedged/locked. Conversely, when pushed/driven in the opposite direction by the wedge driving device 16, the tapered surfaces 19 are released, the convexity 15A of the wedge 15 drops from the stepped portion 17C, and a clearance is formed with respect the wedge 15 to permit the movement of the forming member 17A provided to the reciprocating driver 11. The wedge engagement unit 17 and wedge 15 are designed with a shape in which a clamping/releasing space is maintained in a state in which the convexity 15A is released and caused to fall from the stepped portion 17C to release the pushing/engaging action.

A lever mechanism 20 is provided to the clamp mechanism 8. In other words, the reciprocating driver 11 (pushrod) is driven using a reciprocating rod 9A of the air cylinder device 9 by way of the lever mechanism 20. More specifically, a force point 25 is provided to one end of a lever 24 that rotates about a fulcrum 23 pivotably fixed in a prescribed position, the reciprocating rod 9A of the air cylinder device 9 as a lever drive device is linked to the force point 25, an actuator 26 is provided the other end of the lever 24 in a position in which the distance from the fulcrum 23 is less than the distance between the force point 25 and the fulcrum 23, and the reciprocating driver 11 is reciprocated by the actuator. Also provided is a lever mechanism 20 capable of reciprocating and controlling the reciprocating driver 11 by increasing the reciprocating driving of the reciprocating rod 9A of the cylinder device 9.

To provide a description in further detail, the present example is configured so that when a force is applied to the force point 25 on one side of the lever 24 driven by the reciprocating rod 9A of the air cylinder device 9 that serves as the lever driving device (or by the urging of the elastic body produced by the release of the driving), a rotational force about the fulcrum 23 is generated in the actuator 26, an increased rotational force is generated on the actuator 26 by the difference in the distance to the fulcrum 23, and the increased force causes the reciprocating driver 11 to press down against the retraction force of the elastic member 10.

A pusher 26A for pushing/making contact with the retracting pushers 11A and 11B of the reciprocating driver 11 is provided to the actuator 26. In the present example, the retracting pushers 11A and 11B of the reciprocating driver 11 are provided so that their movement can be adjusted, whereby the pusher 26A presses/drives the reciprocating driver 11, and the retraction hold position of the reciprocating driver 11 is finely adjusted by the lever mechanism 20. In other words, the retracting pusher 11A provided to the reciprocating driver 11 is threadably engaged with a screw portion provided to the reciprocating driver 11, and the lower surface of the threadably mounted retracting pusher 11A and the upper surface of the retracting pusher 11B are pressed upward by the actuator 26 of the lever 24. The threadably adjusted position is fixed with the double nut method, and the retracted position of the reciprocating driver 11 can be finely adjusted.

A double nut structure allowing positional adjustment is similarly provided to a position facing the retracting pusher 11A.

The present example is further configured so that when a rotating tool 1A is clamped/fixed, a cylinder device 9 provided as the drawbar driving device 9 is driven from the first clamp position b and is temporarily brought to the second clamp position c, and is thereafter driven or released and brought to the first clamp position b, at which the rotation allowance gap 14 is maintained between the stopper 12 and the support unit 13 by the return force of the return elastic member 21. The supply/discharge of the driving medium of the cylinder 9 is cut off at the first clamp position b to allow the first clamp position b to be maintained.

In other words, in the present example, the force point side of the lever 24 is supported using the return elastic member 21, and a return force is generated when the cylinder device moves to the second clamp position c. In the absence of a load, the device is kept in the first clamp position b, in which the rotation allowance gap 14 or the like is constantly maintained. However, repeated use of the air cylinder device 9 is accompanied by a reduction in resistance, and the cylinder position varies when the return elastic member 21 weakens or otherwise loses force. When this happens, the first clamp position b, which is supposed to preserve the rotation allowance gap 14, tends to become unstable (rotation allowance gap 14 cannot be adequately assured). In view of the above, in the present example, the return elastic member 21 is provided to keep the device in the first clamp position b, but to reach the first clamp position b, the device is first temporarily brought to the second clamp position c and then to the first clamp position b. In this position, the air from the cylinder device 9 is shut off so that the position can be reliably maintained.

The present invention in not limited by the present working example and allows the specific configuration of the constituent features to be suitably designed.

What is claimed is:

1. A tool mounting device for a turning center in which: rotating tools and turning tools are exchanged and used,
    wherein a mounting engagement unit for engaging a tapered shank provided to a base end of a tool is disposed on a main shaft that is rotatably mounted on a ram via a bearing unit; and
   a clamp mechanism is disposed for clamping a clamping convexity of said tapered shank by retracting a drawbar and drawing in and engaging said tapered shank to the mounting engagement unit to fix tools to said main shaft so as to allow the shank to be clamped and released based on the reciprocating control of said drawbar, comprising:
   a positioning strike receiving portion provided to said ram, which a positioning outer surface of the turning tool strikes when at least said turning tool is fixed; and
   the structure and arrangement of the bearing unit being set so that said positioning outer surface strikes said positioning strike receiving portion when said drawbar is retracted, and said bearing unit is deformed by the retraction force applied to the drawbar by the clamping action of said clamp mechanism because the retracted position of said drawbar is maintained in the struck state, and said mounting engagement unit exerts elastic contact on said tapered shank.

2. The tool mounting device for a turning center according to claim 1, wherein the bearing unit comprises ram-fixed portions fixed to said ram, main shaft-fixed portions fixed to the rotating main shaft, and bearing balls rollably interposed therebetween; and
    when said drawbar is retracted, the main shaft-fixed portions of said bearing unit are moved in the return direction of said drawbar by the retraction force applied to said drawbar in a state in which said positioning outer surface of said turning tool is in contact with said positioning strike receiving portion of said ram, the tapered shank is pressed to the mounting engagement unit, and said turning tool is fixed in a state of dual-surface restraint.

3. The tool mounting device for a turning center according to claim 1 or 2, wherein said positioning outer surface is a tapered outer surface that narrows toward an outer surface of a distal end portion of said turning tool;

said positioning strike receiving portion is also a narrowing tapered receiving surface, and when said turning tool is fixed, said positioning outer surface strikes said positioning strike receiving portion prior to said tapered shank making pressured contact with said mounting engagement unit, and said tapered shank exerts contact on said mounting engagement unit by the deformation of said bearing unit.

4. The tool mounting device for a turning center according to claim 3, wherein said clamp mechanism is configured so that said drawbar is retracted by a retraction force produced by an elastic member of the clamp mechanism to actuate said clamping; and said drawbar is returned by pressing against the retraction force of the drawbar driving device to release said clamping.

5. The tool mounting device for a turning center according to claim 3, wherein said clamp mechanism is provided with a wedge mechanism for engaging a wedge moved by a wedge driving device in a wedge engagement unit and locking the retracted position of said drawbar when said turning tool is fixed.

6. The tool mounting device for a turning center according to claim 1 or 2, wherein said clamp mechanism is configured so that said drawbar is retracted by a retraction force produced by an elastic member of the clamp mechanism to actuate said clamping; and said drawbar is returned by pressing against the retraction force of the drawbar driving device to release said clamping.

7. The tool mounting device for a turning center according to claim 6, wherein said clamp mechanism is provided with a wedge mechanism for engaging a wedge moved by a wedge driving device in a wedge engagement unit and locking the retracted position of said drawbar when said turning tool is fixed.

8. The tool mounting device for a turning center according to claim 1 or 2, wherein said clamp mechanism is provided with a wedge mechanism for engaging a wedge moved by a wedge driving device in a wedge engagement unit and locking the retracted position of said drawbar when said turning tool is fixed.

9. The tool mounting device for a turning center according to claim 1 or 2, wherein a tapered inner surface of a tapering portion provided to an external end portion of said ram acts as the positioning strike receiving portion, a drive key with which a key groove of said rotating tool engages is provided to the external end portion of said main shaft, and the drive key is disposed within said tapering portion; and the shape of the drive key substantially matches the shape of the positioning strike receiving portion of said tapering portion.

* * * * *